United States Patent
Charles

(10) Patent No.: US 9,214,986 B2
(45) Date of Patent: Dec. 15, 2015

(54) NON-VOLATILE MEMORY FOR NFC ROUTER

(71) Applicant: STMicroelectronics (Rousset) SAS, Rousset (FR)

(72) Inventor: Alexandre Charles, Auriol (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 151 days.

(21) Appl. No.: 13/767,733

(22) Filed: Feb. 14, 2013

(65) Prior Publication Data

US 2013/0225074 A1    Aug. 29, 2013

(30) Foreign Application Priority Data

Feb. 29, 2012   (FR) ..................... 12 51855

(51) Int. Cl.
*H04B 5/00* (2006.01)
*H04M 1/725* (2006.01)
*G06K 7/10* (2006.01)

(52) U.S. Cl.
CPC .......... *H04B 5/0037* (2013.01); *G06K 7/10247* (2013.01); *H04M 1/7253* (2013.01); *H04M 2250/04* (2013.01)

(58) Field of Classification Search
CPC ........... H04B 5/0037; G06K 7/10247; H04M 1/7253; H04M 2250/04
USPC .................................. 455/41.1, 73
See application file for complete search history.

(56) References Cited

U.S. PATENT DOCUMENTS

| | | | |
|---|---|---|---|
| 2010/0151790 A1* | 6/2010 | Hoeksel et al. | 455/41.2 |
| 2010/0240303 A1* | 9/2010 | Charrat | 455/41.1 |
| 2010/0330904 A1* | 12/2010 | Stougaard | 455/41.1 |
| 2011/0270999 A1* | 11/2011 | Marseille et al. | 709/228 |
| 2012/0100804 A1* | 4/2012 | Miles | 455/41.1 |
| 2012/0178365 A1* | 7/2012 | Katz et al. | 455/41.1 |

FOREIGN PATENT DOCUMENTS

CN    101 908 157 A    12/2010

OTHER PUBLICATIONS

French Search Report, dated Nov. 19, 2012 for French application No. 1251855, 9 pages.
Texas Instruments, "Mobile Wireless LAN: WiLinkTM 8.0 Soulutions," Feb. 13, 2012 http://www.ti.com/ww/en/wtbu/wilink8/, 10 pages.
"Smart Cards; UICC—Contactless Front-End (CLF) Interface; Part 1: Physical and Data Link Layer Characteristics (Release 11)"; Technical Specification; European Telecommunications Standards Institute 2012; 57 pages.

* cited by examiner

*Primary Examiner* — Lewis West
(74) *Attorney, Agent, or Firm* — Seed IP Law Group PLLC

(57) ABSTRACT

A plurality of circuits in a same package including a first integrated circuit having at least one NFC-type communication interface and at least one communication interface of another type, and a second integrated circuit having a security module with a non-volatile memory, the non-volatile memory being used by the NFC interface to store configuration data.

20 Claims, 3 Drawing Sheets

NON-VOLATILE MEMORY FOR NFC ROUTER

BACKGROUND

1. Technical Field

The present disclosure generally relates to electronic circuits and, more specifically, to electronic circuits and architectures integrating a near-field communication (NFC) interface.

2. Description of the Related Art

More and more mobile telecommunication devices are equipped with near-field communication interfaces, generally called NFC routers. An NFC router provides the device with additional functions. An NFC router can operate either in card mode, the device then having the functions of a contactless communication card, or in reader mode, the device then having the functions of a contactless card reader and/or write terminal.

In card mode, the device is capable of operating by being powered by the field radiated by a terminal with which it communicates and without using the power of the device battery. In such a mode, the contactless communication interface however does not have access to all the circuits equipping the device containing it since this would generate too high a current consumption.

Such a problem is not posed in reader mode where the device uses its battery to emit a high-frequency field capable of being detected by another device operating in card mode. In such a configuration, all the circuits of the mobile device are available for the NFC router.

The NFC router of course has memory circuits, among which reprogrammable non-volatile memory elements enable the device to keep, among others, its configuration data. Since the NFC router generally does not have access to the device memories when it is in card mode, which would generate too high a current consumption, most NFC routers integrate their own non-volatile memory elements.

Contactless communication interfaces integrated with other communication circuits start appearing. Such multiple-function or multiple-connectivity circuits are generally called "combo" circuits. The aim is to integrate, in a same chip, the contactless communication functions (NFC) and other communication functions such as, for example, Bluetooth, IEEE 802.11 Wifi, etc. Now, such combo circuits generally use analog technologies which do not provide the integration of non-volatile memories. Conventionally, a combo circuit of this type uses a generic external non-volatile memory belonging to the device.

BRIEF SUMMARY

An embodiment overcomes all or part of the disadvantages of circuits integrating a near-field communication interface and other communication circuits in a same chip.

Another embodiment avoids the need for a non-volatile memory external to a combo communication circuit. Thus, an embodiment provides a circuit having, in a same package an integrated circuit having at least one NFC-type communication interface, and one communication interface of another type, and an integrated circuit having a security module with a non-volatile memory. The non-volatile memory is used by the NFC interface to store configuration data.

According to an embodiment, communications between the NFC interface and the non-volatile memory exploit a single wire protocol, SWP-type bus. Another embodiment provides a method for sharing a non-volatile memory of a security module connected by an SWP-type bus to an NFC-type communication interface, wherein the non-volatile memory is used to store data of configuration of the near-field communication interface. According to an embodiment, after the activation of the SWP bus, which follows the initialization of the NFC interface, the NFC interface starts an exchange with the non-volatile memory by using the transport layer of a contactless tunneling (CLT) communication protocol such as defined in European Telecommunications Standards Institute (ETSI) standard TS102613.

According to an embodiment, a command of administration of a standardized frame according to ETSI standard TS102613 is used to start a session of communication with the non-volatile memory. Another embodiment provides a mobile telecommunication device integrating a circuit such as hereabove.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been solely selected for ease of recognition in the drawings. One or more embodiments are described hereinafter with reference to the accompanying drawings in which.

DETAILED DESCRIPTION

Figure 1:
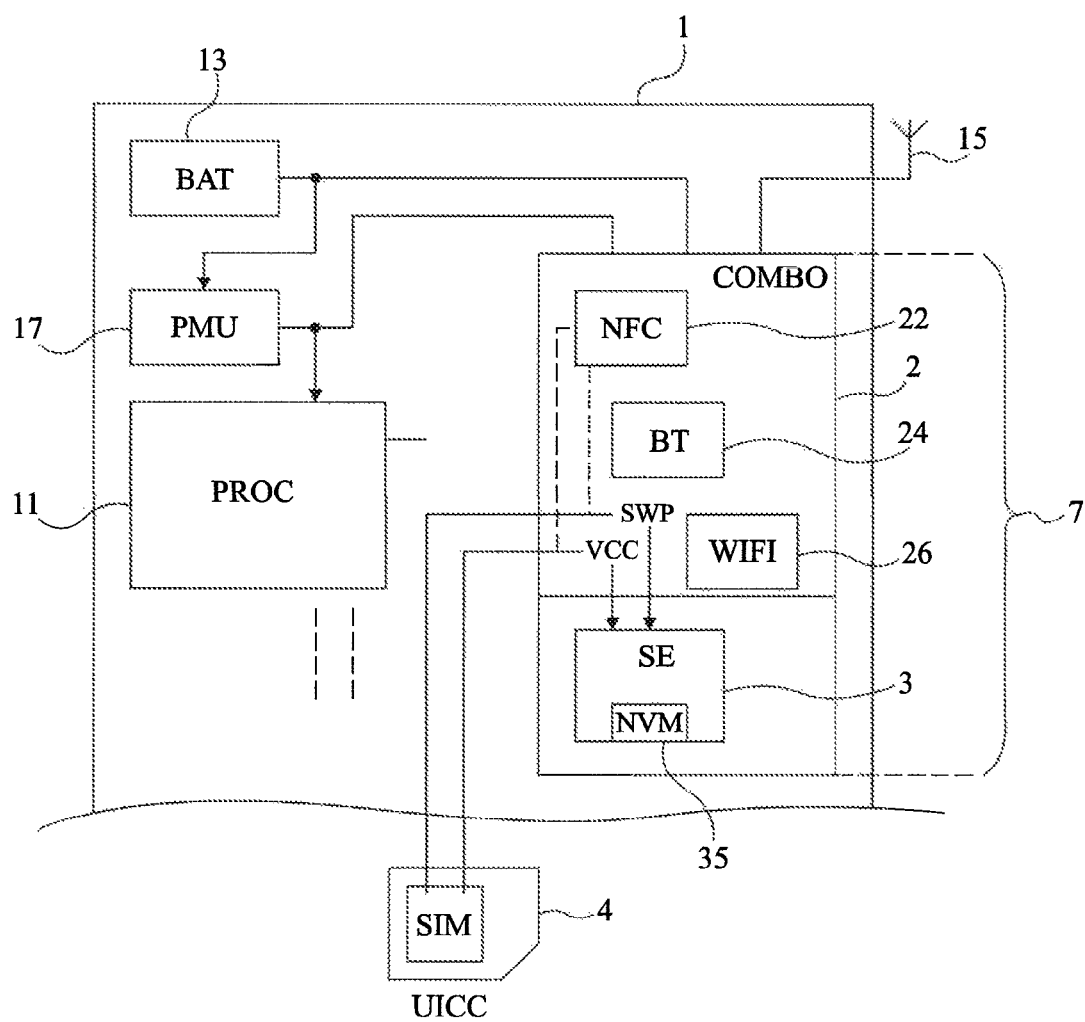
FIG. 1 is a simplified block diagram of an embodiment of a circuit integrating several communication functions, among which is a near-field communication interface in its environment in a telecommunication device.

The same elements have been designated with the same reference numerals in the different drawings. For clarity, only those steps and elements which are useful to the understanding of the discussed embodiments have been detailed. In particular, the handshake protocols between the mobile telecommunication device and distant elements have not been detailed, the described embodiments being compatible with usual protocols. Further, the communication protocols between a near-field communication interface circuit and the other elements of the device in which it is assembled have not been detailed either, the described embodiments being here again compatible with usual systems.

FIG. 1 is a partial simplified representation, in the form of blocks, of an embodiment of a telecommunication device 1. Only part of the device has been shown. In particular, most of its input/output interfaces with a keyboard, a display, or other user interfaces have not been shown, since these elements are not modified by the implementation of the described embodiments.

Device 1 generally includes a main control and processing processor 11 (PROC) which is capable of communicating, via several buses (not shown), with the different circuits of the device. Device 1 also includes a circuit 2 (COMBO) capable of implementing several communication functions. It is a circuit integrating at least one near-field communication interface 22 (NFC router). In the shown example, combo circuit 2 also integrates a Bluetooth-type (BT) interface 24 and a Wifi-type interface 26 (WIFI) such as 802.11.

As previously indicated, the presence of an NFC router results in that device 1 is capable of operating either by using the power of a battery 13 (BAT), or by using the power received by an antenna 15 capable of receiving a field radiated by a terminal (not shown) having device 1 within its range. Usually, device 1 further comprises a power management circuit 17 (PMU—Power Management Unit).

Circuit COMBO 2 is based on an analog technology due to the functions that it integrates. It is in relation with one or several security modules having the function of controlling communications. These elements usually include a secure element 3 (SE) in the form of an integrated circuit permanently assembled in the device and a subscriber identification module 4 (SIM) or a universal identification chip card (UICC).

Secure element 3 is mainly used for the management of the communications of circuits 22, 24, and 26. It is then desired to be placed as close as possible to circuit 2, especially to limit the current consumption when the NFC router operates with no battery. In practice, the integrated circuit forming secure element 3 is assembled in the same circuit package 7 as integrated circuit 2.

At least some embodiments take advantage of the fact that circuit 2 is associated, in a same package 7, with a reprogrammable non-volatile memory 35 integrated in secure element 3. Memory 35 generally has a capacity much greater than the specific needs of the operation of element 3. In one embodiment, memory 35 has a capacity on the order of one megabyte while the operation of the applications of the secure element (for example, key derivation, cryptographic algorithm, etc.) only requires a few tens of kilobytes. It is thus provided to take advantage of this available capacity.

The different circuits also integrate non-reprogrammable non-volatile memories (e.g., ROMs) and random-access memories (RAMs), but in this disclosure, only the specific memory needs of reprogrammable non-volatile memories, which cannot be satisfied with other types of memories, are considered. In the following description and unless otherwise specified, "non-volatile memory" means a reprogrammable non-volatile memory.

It could have been devised to use the non-volatile memory contained in SIM card 4. However, this element is external to device 1, is interchangeable, and must comply with a standard (mainly ETSI). Accordingly, this element is too versatile for its non-volatile memory to be used for the configuration of the NFC router.

The communication between the NFC router and more generally circuit 2 and element 3 is generally performed by means of a single wire protocol (SWP)-type bus. This bus is especially used for exchanges between communicating circuits 22, 24, and 26 and SIM card 4 or security module 3 for the control of communications managed by communicating circuits 22, 24, and 26. Further, the power supply of SIM card 4 as well as of secure element 3 comes from the NFC router to enable these elements to operate in card mode (i.e., OFF battery).

Other signals currently used between security modules 3 and 4 and the different circuits (clock signal, input-output other than on an SWP bus for other exchange modes, etc.) have not been illustrated and are not modified.

Advantage is taken from the presence of the SWP bus electrically coupling the NFC router to element 3 to access non-volatile memory 35 of this element independently from security functions.

Exchanges between the NFC router and secure element 3, and thus its volatile memory 35, may use different communication levels.

In a first embodiment, these exchanges are provided to be managed at the application level. This includes providing two specific application programs, one on the NFC router side and the other on the secure element side, which is not always desirable.

Another solution is to manage these exchanges at the exploitation system level.

In the two above processes, the router is powered and initialized. Accordingly, the NFC router will perform a first initialization phase only based on the use of its non-reprogrammable non-volatile memory (ROM), which does not require using memory 35.

Two other levels in which the exchanges between the NFC router and the secure element can be managed are the physical level and the transport layer.

The physical level is the very fast level of the system compatible with an operation in an OFF battery mode. It is indeed desirable for exchanges between the non-volatile memory and the NFC router for configuration purposes to be initiated as soon as the router is remotely powered by a reader, even before the exchange of an RF communication with this reader. In practice, the physical level is used to exchange a few kilobytes of data between the NFC router and the non-volatile memory before starting a communication. Now, it is desired for this communication to start a few milliseconds (for example, on the order of 5 milliseconds) after a field has started being detected.

However, the management of such exchanges at the physical layer level consumes more current than in the other levels. In particular, a dedicated communication interface, apart from the SWP bus which is not activated yet, is placed between the NFC router and the non-volatile memory, independent from any communication between the secure element and this NFC router. The use of two communication interfaces (i.e., dedicated interface and SWP bus) in OFF battery mode generates the corresponding demand for current.

Thus, according to a preferred embodiment, the transport layer is used to manage exchanges between this NFC router 22 and the secure element 3. The transport layer is commonly used to manage NFC applications and is defined in an ETSI standard TS102613 which defines the physical link and the communication protocols on the SWP bus.

Figure 2:
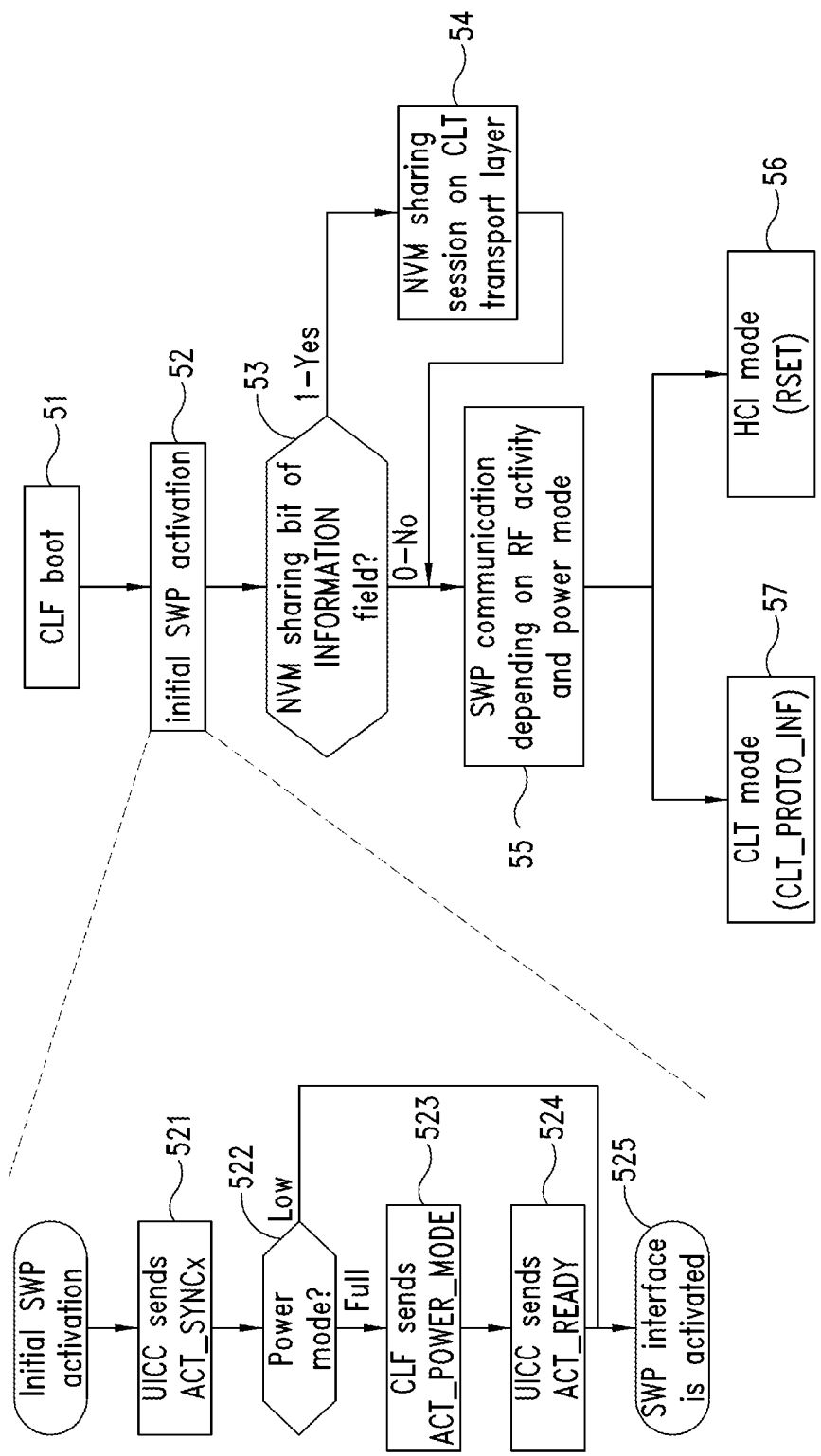
FIG. 2 is a simplified flowchart of a sharing mode of a non-volatile memory equipping a secure circuit in the device of FIG. 1.

FIG. 2 is a simplified flowchart illustrating an example of a sequence of activation of the SWP bus allowing an exchange with the non-volatile memory of the secure element.

When device 1 is within the range of a terminal generating a high-frequency field for a near-field communication, NFC router 22 detects the presence of this field and starts being remotely powered by extracting power from the field radiated by the terminal.

A first step 51 (CLF boot) corresponds to an initialization of the contactless function. This step is followed by an initial activation of the SWP bus (block 52, Initial SWP activation).

This activation usually includes the following successive steps:

SIM card 4 or the UICC card connected to the SWP bus and receiving a command from the NFC router sends a command for activating the SWP bus (block 521, UICC sends ACT_SYNCx). The CLF router detects the system power supply mode (block 522, Power mode?). If the power management mode is full power, that is, circuit 2 is powered by battery 13 internal to device 1 (output full of block 522), the router sends, over the SWP bus, a command for activating the power supply mode (block 523, CLF sends ACT_POWER_MODE). At 524, the UICC card provides an acknowledgement by sending a command confirming the activation (block 524, UICC sends ACT_READY), and the SWP interface is then active (block 525, SWP interface is activated). Alternatively at 522, if the mode is the low-power mode (default mode), and the power only comes from the field detected by the antenna (output low of block 522), controls 524 and 523 are omitted, and the SWP interface is activated in low-power mode.

After the activation of the SWP bus, the CLF router tests the desire for an exchange with memory 35 before setting up a communication. This amounts to checking whether the NFC router is already initialized or not. For example, it is provided to verify the state of a bit indicative of the desire for a communication with the non-volatile memory of the secure element (block 53, NVM sharing bit of INFORMATION field?). If a configuration desire is established (output 1—YES of block 53), the NFC interface starts a session with non-volatile memory 35 of the secure element by using the transport layer (CLT—ContactLess Tunneling) of the SWP link (block 54, NVM sharing session on CLT transport layer). Otherwise (output 0—NO block 53), this means that the NFC router is properly configured and does not desire access to the non-volatile memory.

At the end of step 54, or in the absence of a desire for an exchange with memory 35, a communication is started on the SWP bus according to the radio activity, that is, to the frames received from the terminal (block 55, SWP communication depending on RF activity and power mode). This communication is performed, according to applications, either in a so-called host controller interface (HCI) mode (block 56, HCI mode (RSET)) which is a relatively slow communication mode using the transport layer of the CLT protocol or another mode, which is generally used in bank modes, that is, in CLT mode (block 57, CLT mode, (CLT_PROTO_INF)), which is a faster communication mode.

Figure 3A:
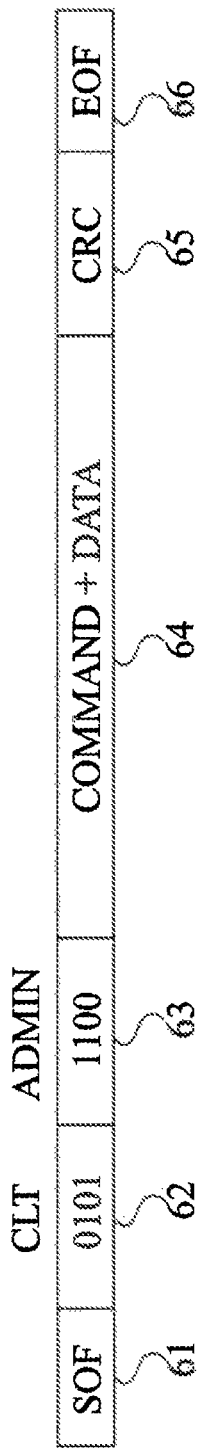
FIGS. 3A and 3B illustrate an embodiment using an SWP-type protocol.
Figure 3B:
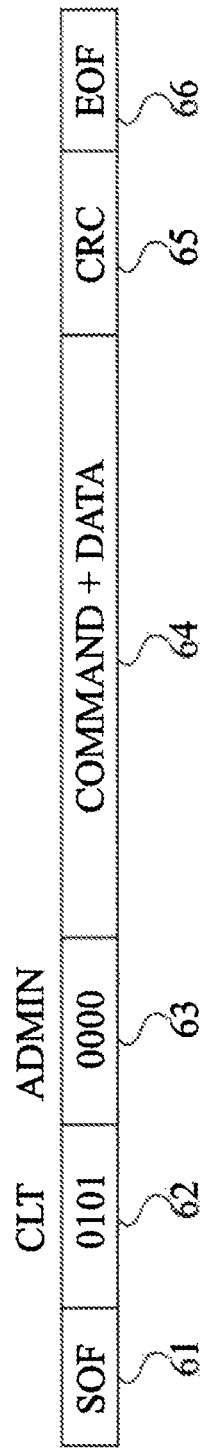

FIGS. 3A and 3B illustrate an example of communication frames taking advantage of the existence of an unused administration command available according to the format defined by the above-mentioned ETSI standard.

FIG. 3A illustrates the initial frame when it is desired to communicate with the non-volatile memory of the secure element. FIG. 3B illustrates the subsequent frames of a communication towards this non-volatile memory.

The frame starts with a field 61 containing an start of frame (SOF) code indicative of a start of frame, followed by a code of definition of the CLT mode 62. This field contains the binary value 0101 according to the ETSI standard.

After frame 62, the frames of FIGS. 3A and 3B differ according to whether the transmission to the non-volatile memory is initiated or it is already set up.

In the FIG. 3A first case, an administration field 63 (ADMIN) is used by taking advantage of the existence of free values. For example, value 1100 is selected as indicating the desire for an exchange with the non-volatile memory. The rest of the frame (29 bytes in the example given hereabove) is used for the transmission of the commands and of the data (field 64, COMMAND+DATA), and then of an error correction code (field 65, CRC) and then of a field 66 indicating the end of the frame (EOF—End Of Frame).

If the exchange with the non-volatile memory requires less than the 29 bytes of field 64, a single frame is used.

If this capacity is not sufficient, one or several following frames such as illustrated in FIG. 3B are then used. These frames of FIG. 3B differ from those of FIG. 3A by the fact that field 63 is left at a value 0000 indicating that there is no administration command in the frame. Thus, it is remained in the state set by value 1100 (frame of FIG. 3A). The output of a session of exchange with the non-volatile memory is performed by means of a specific command in field 64 indicating an end of session.

To be able to properly exchange data with the non-volatile memory, it is provided to define specific commands implemented by the software layer once administration command 1100 has been activated. These commands typically are commands for reading (Read), writing (Write), reading the answer (Read_answer), reading the status of the exchanged data (Read_status), writing the status of the exchanged data (Write_status), and for ending a session (End_session). The read, write, and end-of-session commands are sent by the NFC router. The commands for reading the answer and for reading and writing the status of the exchanged data are sent by the secure element.

The commands may for example be implemented with four bytes of definition of the address of the area to be read from in the secure element (this number depends on the capacity of memory 35), followed by the size of the data packet.

Various embodiments have been described, various alterations and modifications will occur to those skilled in the art. Further, the practical implementation of the discussed embodiments is within the abilities of those skilled in the art based on the functional indications given hereabove. In particular, the programming of an NFC interface and of a secure element in order for them to be capable of using the described embodiments is within the abilities of those skilled in the art based on these functional indications and by using tools known per se. In particular, reference will be made to the above-mentioned ETSI standard for the definition of the sizes of the different fields and the available commands.

The various embodiments described above can be combined to provide further embodiments. Aspects of the embodiments can be modified, if necessary to employ concepts of various patents, applications and publications to provide yet further embodiments. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit in a single package, comprising:
 a first integrated circuit having a near field communication (NFC) communication interface, and a non-NFC communication interface; and
 a second integrated circuit having a security module, the security module having a non-volatile memory, the non-volatile memory accessible through the NFC communication interface and arranged to store configuration data, wherein the NFC communication interface is configured to carry out a session of exchange with the non-volatile memory using a frame-based communication protocol wherein a first frame is configured to include a first administrative bit pattern initiating communications with the non-volatile memory, and subsequent frames are configured to include a second administrative bit pattern continuing the session of exchange.

2. The circuit of claim 1, comprising:
 a single wire protocol (SWP) bus coupling the NFC communication interface to the non-volatile memory, wherein the first administrative bit pattern initiating communications with the non-volatile memory includes binary "1100" and wherein the second administrative bit pattern continuing the session of exchange includes binary "0000".

3. The circuit of claim 2, comprising:
 a plurality of terminals coupleable to an identity module, a first one of the plurality of terminals coupled to the SWP bus, and a second one of the plurality of terminals configured to pass current.

4. The circuit of claim 1, comprising:
 an antenna terminal coupled to the NFC communication interface and coupleable to an antenna, wherein the NFC communication interface is configured to collect power via the antenna and distribute the power to the circuit.

5. The circuit of claim 4, comprising:
 a battery terminal coupled to the NFC communication interface, wherein the NFC communication interface is configured to distribute the power to the circuit.

6. The circuit of claim 5, comprising:
 a power management terminal, the power management terminal configured to pass a signal to direct the NFC communication interface to electrically couple one of the antenna terminal or the battery terminal to the circuit.

7. The circuit of claim 1 wherein the non-NFC communication interface conforms to at least one of a Bluetooth standard and an IEEE 802.11 standard.

8. The circuit of claim 1 wherein the frame based communication protocol is configured to include a plurality of bit patterns, different ones of the plurality of bit patterns representing a Read command, Write command, and a Status command.

9. The circuit of claim 8 wherein the frame-based communication protocol conforms to the European Telecommunications Standards Institute (ETSI) standard TS102613.

10. A method comprising:
 sharing a non-volatile memory of a security module coupled by a single wire protocol (SWP) bus to a near field communication (NFC) communication interface, the security module and the NFC communication interface arranged in a single package, the sharing including:
 carrying out at least two sessions of exchange between the NFC communication interface and the non-volatile memory using a frame-based communication protocol wherein a first frame communicated from the NFC communication interface to the non-volatile memory during a session includes a first administrative bit pattern initiating communications with the non-volatile memory, and subsequent frames of the session include a second administrative bit pattern continuing the session;
 storing, during a first one of the at least two sessions of exchange, configuration data of the NFC communication interface in the non-volatile memory via the SWP bus; and
 retrieving, during a second one of the at least two sessions of exchange, at least some of the configuration data of the NFC communication interface stored in the non-volatile memory via the SWP bus.

11. The method of claim 10, comprising:
 initializing the NFC interface;
 activating the SWP bus; and
 starting an exchange with the non-volatile memory using a transport layer of a contactless tunneling (CLT) communication protocol, the exchange started with the initialized NFC interface and carried out over the SWP bus.

12. The method of claim 11, wherein starting an exchange comprises:
 issuing a command of administration of a standardized frame according to European Telecommunications Standards Institute (ETSI) standard TS102613 to start a session of communication with the non-volatile memory.

13. The method of claim 10, comprising:
 detecting whether or not the single package is within the presence of a radio-frequency field;
 receiving an input signal based on the detection, the input signal indicating a power mode of the single package, the power mode being one of high power or low power; and
 passing power from a battery or an antenna to the NFC interface and the security module, the passing based on the indicated power mode.

14. The method of claim 13, comprising:
 detecting whether or not configuration data of the NFC interface is requested;
 initializing the NFC interface;
 activating the SWP bus;
 starting a first exchange with the non-volatile memory using a frame-based communication protocol, the first exchange started with the initialized NFC interface and carried out over the SWP bus; and
 starting a second exchange with the non-volatile memory using the frame-based communication protocol, the second exchange started if all of the configuration data is not received after starting the first exchange.

15. The method of claim 14, comprising:
 starting a data exchange with the non-volatile memory using the frame-based communication protocol, the data exchange based on radio communications passed via the antenna.

16. A mobile telecommunication device, comprising:
 a plurality of integrated circuits in a single package, the plurality including a near field communication (NFC) communication interface and a non-NFC communication interface;
 a battery;
 an antenna;
 a security identity module having onboard a writable non-volatile memory, wherein the NFC communication interface is configured to carry out a session of exchange with the writable non-volatile memory using a frame-based communication protocol wherein a first frame is configured to include a first administrative bit pattern initiating communications with the writable non-volatile memory, and subsequent frames are configured to include a second administrative bit pattern continuing the session of exchange; and a power management unit (PMU), the PMU configured to control whether the single package will receive power drawn from the battery or generated via the antenna.

17. The mobile telecommunication device of claim 16, comprising:
an identity module having a memory; and
a single wire protocol (SWP) bus coupling the NFC communication interface to the writable non-volatile memory in the security module and to the memory of the identity module.

18. The mobile telecommunication device of claim 16 wherein the non-NFC communication interface arranged in the single package is a Bluetooth interface or a WiFi interface.

19. The mobile telecommunication device of claim 17 wherein communications over the SWP bus conform to the European Telecommunications Standards Institute (ETSI) standard TS102613.

20. The mobile telecommunication device of claim 16 wherein the frame based communication protocol is configured to include a plurality of bit patterns, different ones of the plurality of bit patterns representing a Read command, a Write command, and a Status command.

\* \* \* \* \*